No. 699,543. Patented May 6, 1902.
H. P. MAXIM.
MOTOR VEHICLE.
(Application filed June 3, 1896. Renewed Aug. 18, 1899.)

(No Model.) 6 Sheets—Sheet 1.

Fig.1.

Attest:
A. N. Jesbera.
F. M. Eggleston.

Inventor:
Hiram Percy Maxim
by Redding, Kiddle & Greeley
Attys.

THE NORRIS PETERS CO., PHOTO-LITHO., WASHINGTON, D. C.

No. 699,543. Patented May 6, 1902.
H. P. MAXIM.
MOTOR VEHICLE.
(Application filed June 3, 1896. Renewed Aug. 18, 1899.)
(No Model.) 6 Sheets—Sheet 2.

Fig. 2.

Attest:
A. N. Jesbera
F. M. Eggleston

Inventor:
Hiram Percy Maxim
by Redding, Kiddle & Greeley
Attys.

No. 699,543. Patented May 6, 1902.
H. P. MAXIM.
MOTOR VEHICLE.
(Application filed June 3, 1896. Renewed Aug. 18, 1899.)

(No Model.) 6 Sheets—Sheet 5.

Attest:
A. N. Jesbera.
F. M. Eggleston.

Inventor:
Hiram Percy Maxim
by Redding, Kiddle & Greeley
Attys.

No. 699,543. Patented May 6, 1902.
H. P. MAXIM.
MOTOR VEHICLE.
(Application filed June 3, 1896. Renewed Aug. 18, 1899.)
(No Model.) 6 Sheets—Sheet 6.

Attest:
A. N. Jesbera.
F. M. Eggleston.

Inventor:
Hiram Percy Maxim
by Redding, Kiddle & Greeley
Attys.

UNITED STATES PATENT OFFICE.

HIRAM PERCY MAXIM, OF HARTFORD, CONNECTICUT, ASSIGNOR, BY MESNE ASSIGNMENTS, TO ELECTRIC VEHICLE COMPANY, OF JERSEY CITY, NEW JERSEY, AND NEW YORK, N. Y., A CORPORATION OF NEW JERSEY.

MOTOR-VEHICLE.

SPECIFICATION forming part of Letters Patent No. 699,543, dated May 6, 1902.

Application filed June 3, 1896. Renewed August 18, 1899. Serial No. 727,703. (No model.)

*To all whom it may concern:*

Be it known that I, HIRAM PERCY MAXIM, a citizen of the United States, residing in the city and county of Hartford, in the State of Connecticut, have invented certain new and useful Improvements in Motor-Vehicles, of which the following is a specification, reference being had to the accompanying drawings, forming a part hereof, and for which Letters Patent have been granted as follows, to wit: of Belgium, No. 129,469, date of filing July 14, 1897, date of issue July 31, 1897; of France, No. 268,716, date of filing July 13, 1897, date of issue November 12, 1897, and of Great Britain, Nos. 15,949, 15,950, 15,951, and 15,952, all dated July 5, 1897.

This invention relates in general to the construction of motor-vehicles of that class which are intended for use as road-vehicles or horseless carriages; and it has for its object to improve and perfect the construction of such vehicles, so that they shall be better adapted for their intended use.

The invention relates more especially, first, to means for controlling the speed of the vehicle, whereby the speed thereof above a certain fixed speed is regulated by controlling the action of the motor-governor, such fixed speed being the lowest at which the motor can be efficiently governed, while lower speeds are regulated by a controllable speed-changing device between the motor and the driving-wheels of the vehicle; second, to the mode of support or suspension of the motor, with the object of preventing the transmission of the vibrations set up by the operation of the motor to that portion of the vehicle upon which the passengers are seated, and also to prevent the motor from being affected in any way by the movements of that portion of the vehicle upon which the passengers are seated or by variations in the load; third, to the steering mechanism, the object being to render it simple in construction, direct and efficient in action, and not liable to be affected by oscillation of the vehicle-body with respect to the running-gear; fourth, to the construction and arrangement of the means for supporting the front wheels with respect to the front axle or running-gear, with a view to reducing the liability to skidding of the wheels or to possible breakdowns in turning sharp corners at a high rate of speed and to improving generally the supports and bearings for these wheels; fifth, to the means for supporting the front axle, and, sixth, to the construction and arrangement of the gearing for transmitting power from the motor to the rear wheels of the vehicle, the object being to take up the effect of the oscillations of the body of the vehicle or of such portion thereof as supports the motor with respect to the wheels.

Other features of improvement will be pointed out hereinafter.

It will be understood, of course, that all of the various features of improvement are not necessarily employed together in a single structure, but may be separately employed in other structures than that represented herein, if so desired. Furthermore, although I have devised some of these features of improvement with especial reference to their use in a vehicle having a motor of the type of the explosive-engine, nevertheless it will be understood that the invention is independent of the particular kind of motor employed.

In the accompanying drawings, wherein I have illustrated practical embodiments of the various features of my invention.

Referring first to the construction represented in Figs. 1, 2, 3, and 4, it will be seen that the frame of the running-gear comprises, as usual, side bars $a\ a$ and front and rear cross-bars $a'\ a^2$, these bars being preferably tubular in construction. The rear cross-bar $a^2$ has depending arms or hangers $a^3$, which support the rear axle $c^{12}$, and the front crossbar $a'$ furnishes support for the front axle $b$ in a manner hereinafter described. Between the two side bars $a\ a$ extend usual carriage-springs $a^4$, which support the carriage box or body $x$, and carriage-springs $a^5$, which support the motor-platform $y$. The latter is free from the former at all points, and the two are thus supported independently of each other, whereby the vibrations of the motor are prevented from being transmitted to the carriage box or body and the motor is prevented from being affected in any manner by the movements of the carriage box or body. It will be obvious that the springs $a^5$ are made stiff enough to insure the proper action of the transmitting-gearing between the motor and the driving-wheels.

Figure 3:
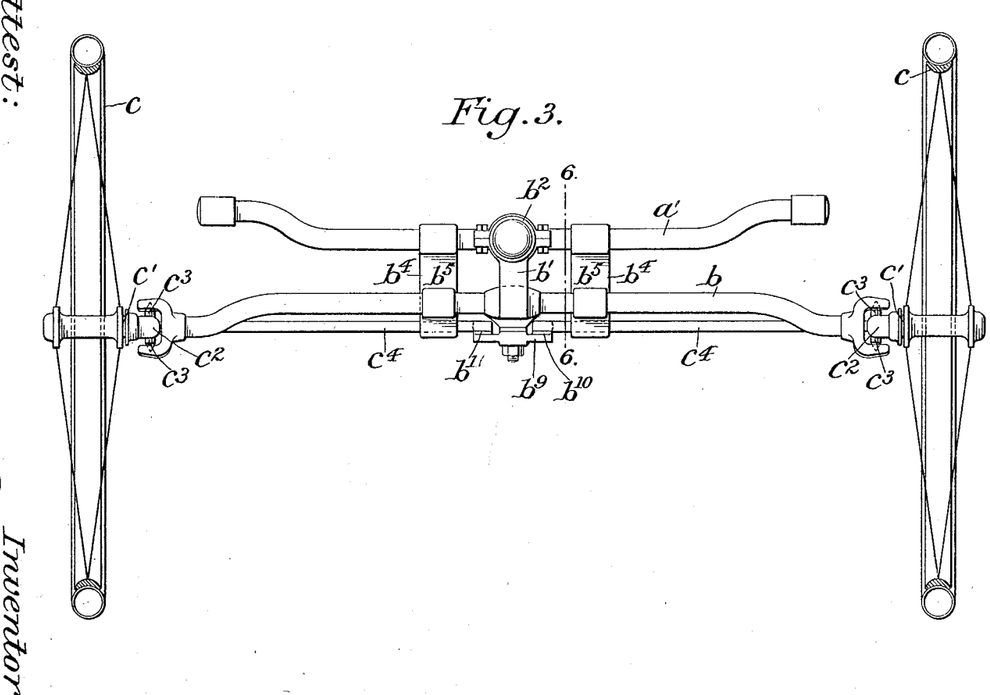
Fig. 3 is a front view of the running-gear, illustrating the means for supporting the front axle, the means for supporting the front wheels, and a portion of the steering mechanism.
Figure 4:
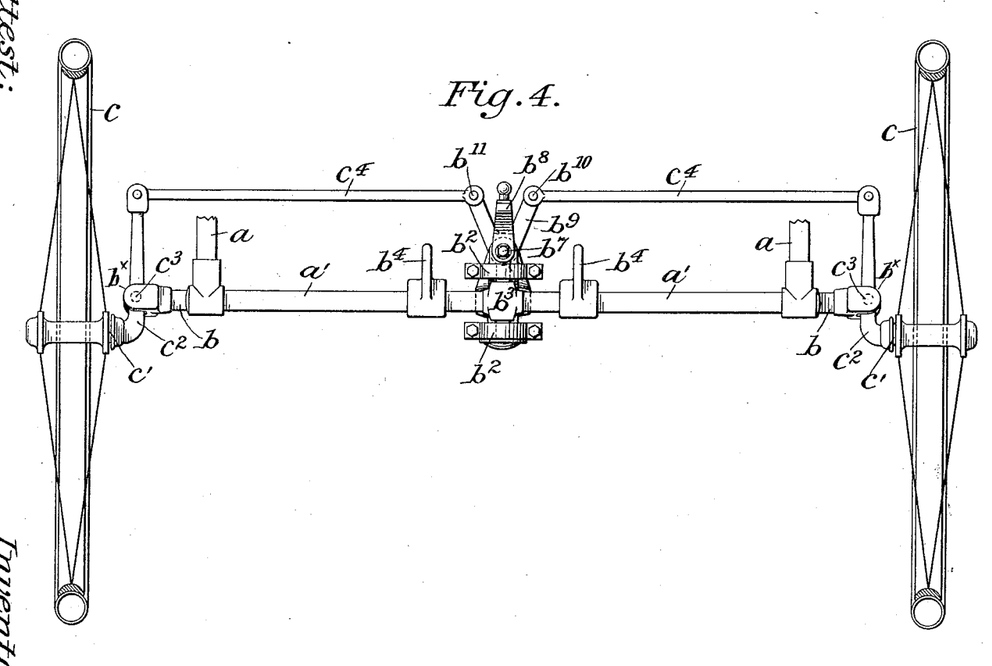
Fig. 4 is a plan view of the parts shown in Fig. 3.
Figures 5, 6:
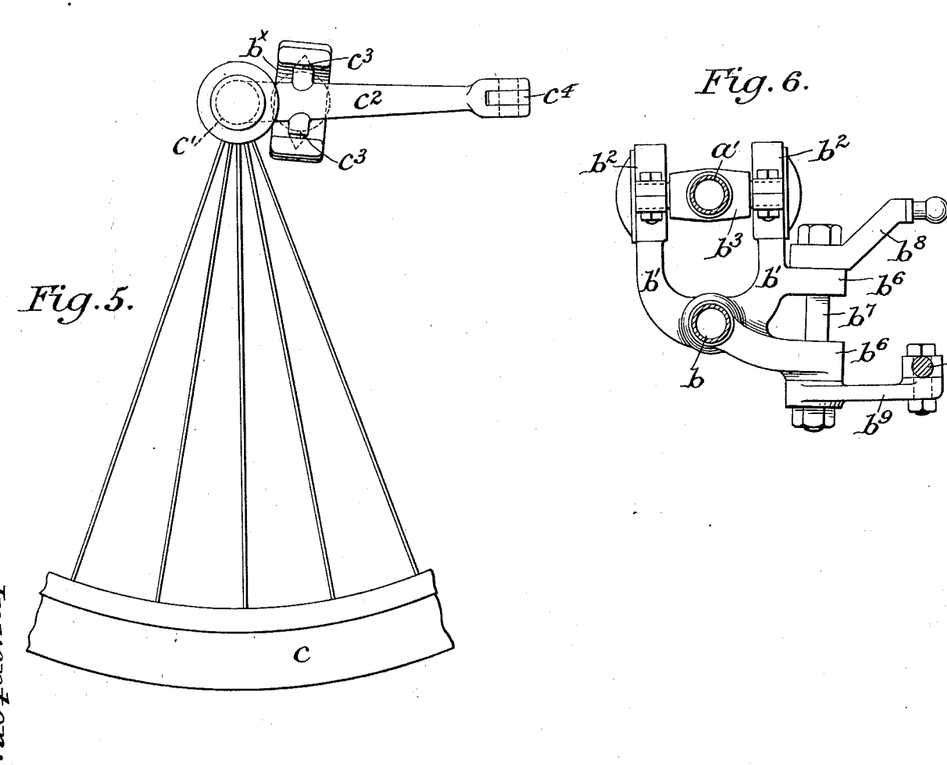
Fig. 5 is a partial side view illustrating the means for supporting the front wheels with respect to the front axle.
Fig. 6 is a detail view in section on a plane indicated by the line 6 6 of Fig. 3.

The front axle $b$ is supported in such a manner as to be capable of oscillating to a limited extent upon a horizontal pivot, so that the four wheels of the vehicle may be at all times in contact with the ground notwithstanding the inequalities of the surface. I prefer to support the axle as represented in Figs. 3, 4, and 6. As there shown, the axle $b$ is secured in the lower portion of a U-shaped frame or yoke $b'$, which in the upper ends of its arms has bearings $b^2\ b^2$ for a hub $b^3$, in which the front cross-bar $a'$ is secured, so that the frame $b'$, and with it the front axle $b$, can oscillate upon the hub $b^2$, the axis of which is substantially horizontal and extends from front to rear. Inasmuch as the front wheels are mounted so as to swing with respect to the front axle, the latter is not arranged to swing upon a vertical pivot, but is held from movement in a horizontal plane by braces $b^4\ b^4$, which are secured to the front cross-bar $a'$ and extend downward in rear of the front axle, having vertical bearing-faces $b^5\ b^5$, against which the front axle is supported and at the same time is free to oscillate in a vertical plane.

Each of the front wheels $c\ c$ is so supported as to be capable not only of rotating upon a horizontal or substantially horizontal axis, but also of swinging or oscillating upon a substantially vertical axis to permit of the turning of the vehicle to one side or the other. This axis of oscillation may be either in the plane of the wheel or at one side of but substantially parallel with the plane of the wheel and is preferably in rear of the axis of the wheel and inclined somewhat to the rear of a vertical line, so that as the wheel is turned to one side or the other it shall at the same time be inclined somewhat from a vertical plane, and thus be enabled to withstand better the side strain, which is most serious, especially in a wire wheel. The means for attaching the front wheels to the axle may be variously arranged, and although I prefer on some accounts the construction and arrangement shown in Figs. 7 to 10, inclusive, I will first describe the construction indicated in the general views represented in Figs. 1 and 2 and shown more fully in Figs. 3, 4, and 5. As there represented each end of the front axle is formed with or has secured thereto a yoke $b^\times$, the plane of which is preferably inclined somewhat to the rear, as shown clearly in Fig. 5. Each wheel $c$ is mounted upon a stud-axle $c'$, which is secured to or forms a part of a bent arm $c^2$. The latter has pivot-studs $c^3$, which are seated in the arms of the yoke $b^\times$. As the arm $c^2$ is oscillated upon its pivots it is obvious that the wheel will be turned or swung to one side or the other and at the same time by reason of the inclination of the pivotal axis will be tipped more or less in one direction or the other, according to the direction and extent of its swinging. It is evident that provision should be made whereby the two wheels shall be oscillated or swung in the same direction at the same time, and it is also desirable that the inside wheel, or the wheel which traverses the arc of the circle of smaller radius in turning a corner, shall be oscillated or swung through a wider angle than the other, so that the tendency of the wheels to slip upon the ground shall be obviated. At the same time, however, the wheels are inclined from the vertical in parallel planes, which reduces the liability to breakdown. These results are accomplished by the arrangement presently to be described. The arms $c^2$ are extended to the rear of the axle $b$ and are connected by links $c^4$ to the steering mechanism, which is disposed between them. As represented in Fig. 6, the yoke or frame $b'$ has rearwardly-extended arms $b^6$, which support a short shaft $b^7$. The latter has secured thereto an arm $b^8$, through which connection is established to the hand-operated devices carried on the body of the vehicle, and a triangular plate or yoke $b^9$, to the opposite corners or extremities of which the links $c^4$ are severally pivoted, as at $b^{10}$ and $b^{11}$. It will be readily understood that when the shaft $b^7$ is partially rotated to one side or the other one of the points, as $b^{10}$, while moving in the arc of a circle toward the point directly in rear of the axis of the shaft $b^7$, will produce an angular movement of the corresponding arm $c^2$ greater than the angular movement of the other arm $c^2$, which is produced by the movement of the point $b^{11}$ away from the point directly in rear of the axis of the shaft $b^7$, thereby effecting the greater angular movement of the inside wheel.

Figures 7, 9, 10:
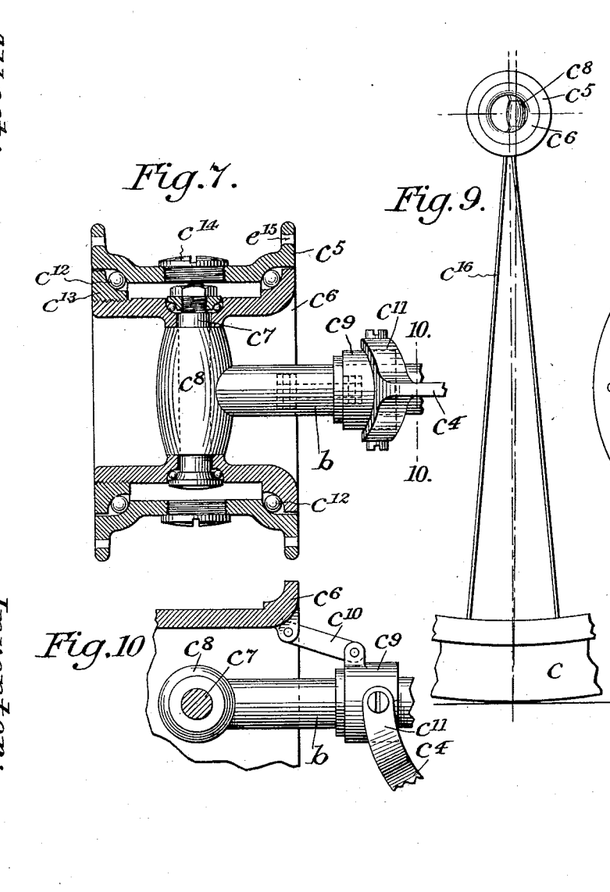
Fig. 7 is a detail view, partly in vertical section, illustrating a modified form of the supporting devices for the front wheels.
Fig. 9 is a partial view in section on a plane at right angles to that of Fig. 9, illustrating more clearly a detail of construction.
Fig. 10 is a side view of a portion of a wheel and its support, showing a further modification of the construction presented in Figs. 7 and 8.
Figure 8:
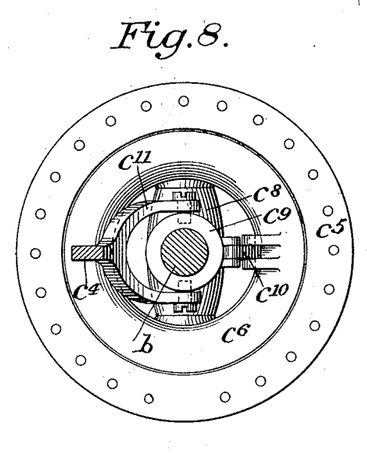
Fig. 8 is a section on the plane indicated by the line 10 10 of Fig. 9.

The construction which I have represented in Figs. 7 to 10, inclusive, is preferable to that just described not only on account of its greater strength for the same weight and its neater appearance, but also because it permits the axis of oscillation of the wheel to lie wholly in the plane of the wheel itself, thereby reducing to a minimum the liability of the wheel to be thrown to one side or the other when it meets an obstruction in the road and rendering the steering of the vehicle so much the easier, and, further, because while affording a wide bearing for the wheel it is at once strong, easy of adjustment, and permits oscillation of the wheel through a wide angle. As represented in said figures, the hub $c^5$ of the wheel is mounted to rotate upon a secondary hub $c^6$, which is preferably in the form of a short section of a tube with relatively thin walls, so as to give a broad surface and also permit oscillation through a wide angle without requiring the parts to be of such large size as to give an undesirable appearance and add largely to the weight. The latter is swiveled or mounted to oscillate upon the end of the axle $b$ by means of a stud $c^7$, which engages the hub $c^6$ and is received in a suitable head $c^8$ on the end of the shaft $b$. A sleeve $c^9$ is mounted to slide upon the shaft $b$ and is connected to a projection at one side of the hub $c^6$ by a suitable link $c^{10}$, so that as the sleeve is moved longitudinally upon the shaft in one direction or the other the hub $c^6$ will be swung in a corresponding direction, carrying with it the wheel which is mounted thereon. The link $c^4$ is provided with a yoke $c^{11}$ to engage the sleeve $c^9$ and is connected to the steering mechanism, as before. In order that the wheel shall tip or incline to one side or the other as it is swung upon its swivel-axis, I prefer to place the stud $c^7$ in rear of the vertical diameter of the hub $c^6$ and to incline it rearwardly, as represented in Fig. 10. The respective ends of the two hubs $c^5$ and $c^6$ are provided with coöperating antifriction bearing cases and cones and balls $c^{12}$ or their equivalents, and one end of one of the hubs, as $c^6$, is provided with a threaded retaining-ring, as at $c^{13}$, which is readily removable to permit the removal of the outer hub from the inner hub and constitute one of the bearings for the balls. In case it should be desired to remove the wheel without disturbing the bearings this can be accomplished by removing the caps $c^{14}$ from the holes in the outer hub in line with the stud $c^7$ and thereafter withdrawing the stud. It is noted also that the hub $c^5$ being constructed for a wire-spoke wheel is necessarily broad and provided with holes $c^{15}$ at its ends for attachment of the spokes $c^{16}$.

Figure 1:
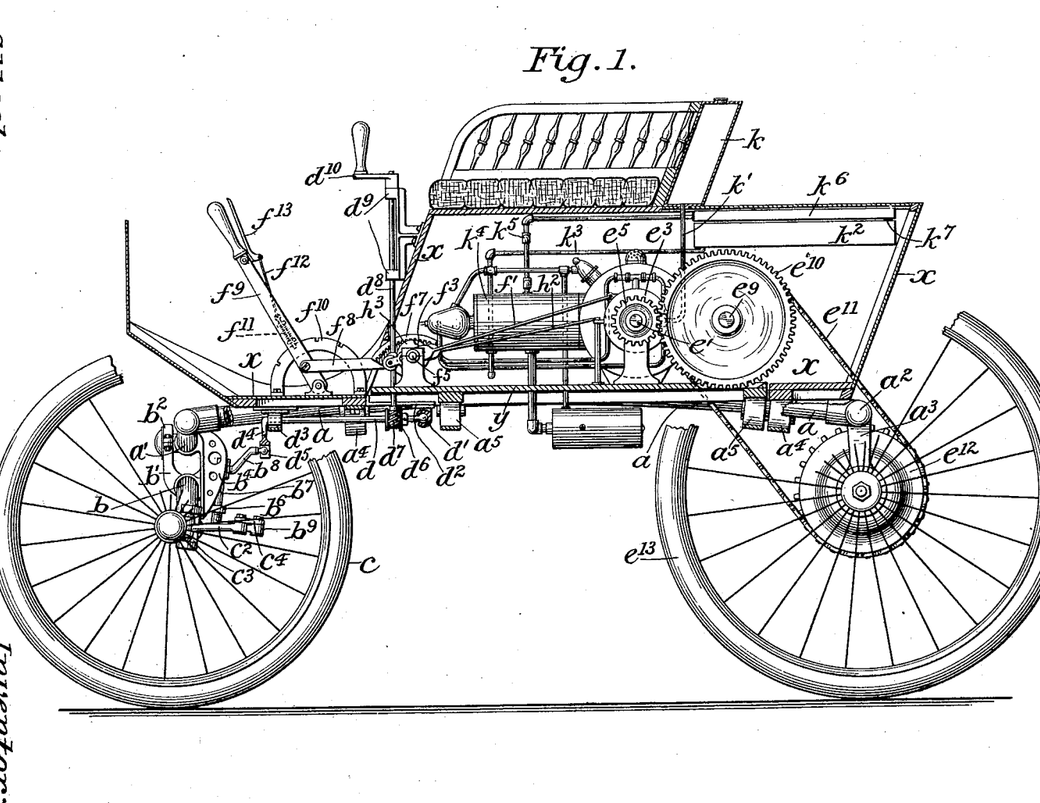
Figure 1 is a view, partly in side elevation and partly in longitudinal section, of a motor-vehicle having some of my improvements applied thereto, it being understood that other features are omitted or replaced by other devices in order to prevent confusion of the drawings.
Figure 2:
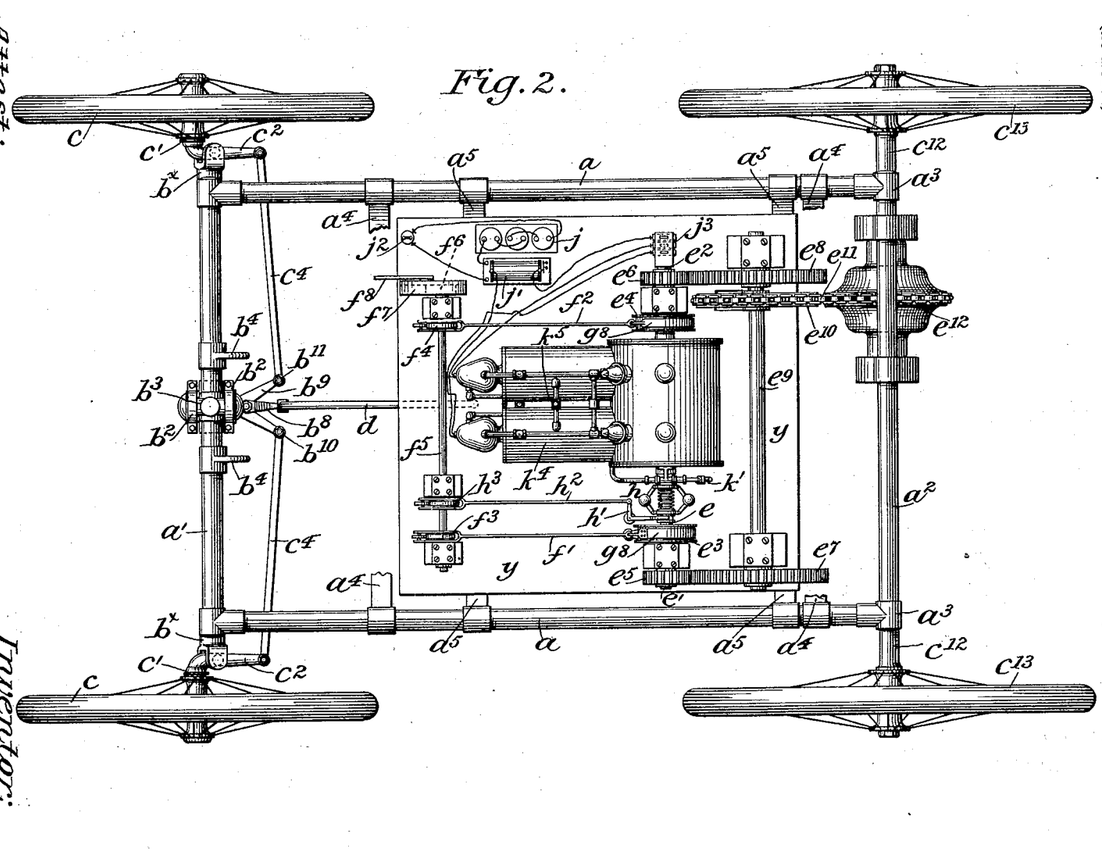
Fig. 2 is a plan view of the same with the carriage box or body removed.

It will be obvious that whether the front wheels are supported with respect to the front axle in the manner represented in Fig. 2 or in that represented in Fig. 7 the necessary oscillations of the front axle upon its horizontal pivot will be permitted without interference with the steering mechanism by reason of the interposition of the links $c^4$ $c^4$, the connections of the latter at their ends being sufficiently loose to permit the proper amount of play. It will also be evident that so far as concerns the selection of one form of wheel-supporting devices or the other it is immaterial what means are employed for enabling the operator to effect the desired movements of the short shaft $b^7$. As a convenient means for this purpose I have shown (see Fig. 1) a shaft $d$, supported at its rear end by a ball-and-socket bearing $d'$, which is carried by a suitable bracket $d^2$, secured to the carriage-body, and at its forward end by a vertically-slotted bearing $d^3$, also secured to the carriage-body. The shaft $d$ is provided at its forward end with an arm $d^4$, which is forked, as at $d^5$, to engage the end of the arm $b^8$. The shaft $d$ is provided near its rear end with a worm-wheel $d^6$, which is engaged by a worm $d^7$ of steep pitch on the lower end of a vertical shaft $d^8$, which is supported in bearings in a suitable bracket $d^9$, carried by the carriage-body, and is provided at its upper end with a suitable hand-wheel or crank $d^{10}$. The arrangement of the bearing of the shaft $d$ and of its connections with the shaft $b^8$ at one end and the shaft $d^8$ at the other permits the several parts to remain in engagement notwithstanding the oscillations of the carriage-body with respect to the running-gear, while the steering of the vehicle is not in any way affected or interfered with.

Having now described the running-gear and steering mechanism of my improved vehicle, it remains for me to describe the means for propelling the vehicle and the means for regulating and controlling the speed and direction of movement of the vehicle. With the particular kind of motor to be employed my present invention is not directly concerned, and it will be evident that a motor of any approved type—such as a vapor, steam, or electric motor—might be employed. I have, however, merely for the sake of convenience in description, represented the vehicle in the accompanying drawings as equipped with a motor of the general character and construction of that which I have described fully in another application for Letters Patent of the United States, filed March 2, 1896, Serial No. 581,418, and I do not herein seek to claim any of the features of such motor *per se*. The shaft $e$ (shown in Figs. 1 and 2) may represent herein the main or driving shaft, to which movement is imparted by any suitable motor. In order to avoid confusion in the general views represented in Figs. 1 and 2 of the drawings, I have therein shown a very simple form of transmitting mechanism and of regulating and controlling devices. As indicated hereinbefore, the motor and parts immediately connected therewith are mount- ed upon a platform, which is supported by springs from the running-gear independently of the carriage-body. As represented in Figs. 1 and 2, the driving-shaft $e$ is mounted in suitable bearings in the motor-casing and short shafts $e'$ and $e^2$, in line with the main shaft $e$, and connected therewith by ahead and backing clutches $e^3$ and $e^4$, respectively, are supported in suitable brackets or standards erected on the motor-platform. The short shafts $e'$ $e^2$ carry pinions $e^5$ $e^6$, which mesh, respectively, with gears $e^7$ $e^8$ on the shaft $e^9$, which is also supported on the motor-platform. A chain-gear $e^{10}$ is fixed on the shaft $e^9$, and through a chain $e^{11}$ and a suitable gear $e^{12}$ on the rear axle $a^2$ drives the latter. In order that the rear wheels $c^{13}$ may have a certain independence of movement, I prefer that the gear $e^{12}$ on the rear axle shall be a balance-gear, such as is shown, for example, in United States Letters Patent to H. M. Pope, No. 373,850, dated November 29, 1887, although the use of such a gear is not essential to the carrying out of my invention. The ahead and backing clutches $e^3$ and $e^4$ permit the vehicle to be propelled in either direction at the will of the operator, and in the construction shown in Figs. 1 and 2 each clutch is controlled by a rod $f'$ or $f^2$, which is operated by a cam $f^3$ or $f^4$ on a shaft $f^5$, mounted in suitable bearings on the motor-platform. At one end the shaft $f^5$ carries a pinion $f^6$, (shown in dotted lines in Fig. 2,) which is engaged by an internal gear-segment $f^7$, which is pivoted on the motor-platform and is operated, through a link $f^8$, from a suitable hand-lever $f^9$, which is mounted on the carriage-body in a convenient position. The usual locking-segment $f^{10}$, locking-bolt $f^{11}$, connecting-rod $f^{12}$, and releasing-lever $f^{13}$ may be provided for the hand-lever $f^9$. The precise construction of the ahead and backing clutches is not material to my present invention, inasmuch as there are many different devices which may be employed for the purpose.

It will be evident that if a speed-changing device, whether of the character of that just described or of any other suitable character, be employed the speed of the vehicle can be controlled within the limit fixed by the speed of the motor or driving-shaft; but under the varying conditions of use of the vehicle it may be desirable that the operator shall be able to vary the speed within wider limits than would be possible with the speed-changing device alone. Consequently I prefer to provide means whereby the operator can control the speed of the motor or driving-shaft itself to a certain extent. For this purpose I provide a governor or speed-controlling device to regulate the speed of the motor or driving-shaft. As represented in Fig. 2, the governor or speed-controlling device $h$ is of the character of that described in my said application for Letters Patent of the United States, Serial No. 581,418, being adapted to control the speed of the motor by regulating the delivery of the oil which forms the basis of the explosive mixture and is operated by a bell-crank lever $h'$, mounted on a suitable standard on the motor-platform, a rod $h^2$, and a cam $h^3$ on the shaft $f^5$. The cams $f^3$, $f^4$, and $h^3$ are so arranged on the shaft $f^5$ relatively to each other as that a movement of the hand-lever $f^9$ to its extreme forward position shall not only tighten the friction-strap on the ahead-clutch $e'$, leaving the strap on the backing-clutch $e^2$ loose, but shall affect the governor $h$, so that the motor shall be driven at its highest speed. As the handle is drawn back the speed of the motor is reduced, and thereafter the friction-strap on the clutch $e'$ is loosened until the vehicle is brought to a standstill, although the motor may continue to operate. As the movement of the handle is continued still farther to the rear the friction-strap on the clutch $e^2$ is gradually tightened and the vehicle is propelled backward at slow speed. It is possible to tighten the governor only after one or the other of the clutches $e'$ or $e^2$ has been tightened up, and such clutch remains tight, although the action of the governor is varied. The great advantage resulting from this arrangement of speed-controlling devices will be readily apparent when due regard is paid to the fact that there is a certain minimum speed below which the speed of a motor, particularly of a motor of the type of that referred to herein, cannot be efficiently regulated. Below such minimum speed of the motor the speed of the vehicle can be regulated as desired by permitting more or less slip of one clutch or the other, while if the clutch is tightened to the full extent the speed of the vehicle can still be increased by tightening the governor of the motor.

I have represented the motor in Fig. 2 as provided with an electric igniting apparatus, comprising a battery $j$, coil $j'$, a cut-out $j^2$, and a switch $j^3$, for directing the current first to one and then to the other of the igniters and arranged to be operated by the shaft $e^2$; but it will be understood that the igniting apparatus forms no part of my present invention.

In Fig. 1 I have indicated a tank $k$ as mounted on the carriage-body and connected with the motor by a pipe $k'$ to supply the oil therethrough, and I have also indicated a reservoir $k^2$, connected by a pipe $k^3$ with the water-jacket of the motor, while a return connection is made from the water-jacket $k^4$ by a pipe $k^5$ with a condenser $k^6$, which is also supported by the carriage-body, being superimposed upon the reservoir $k^2$ and connected therewith, as indicated at $k^7$. The several pipes referred to may be provided with flexible joints or connections to compensate for the relative movements of the motor-platform and the carriage-body; but it is not necessary to describe them herein.

The mode of operation of each feature of my improvement has been sufficiently set forth in connection with the detailed description of the construction, and no further description thereof nor of the mode of use of the vehicle as a whole needs to be included herein.

It will be obvious that many changes can be made in the construction and arrangement of the different parts of the improved vehicle without departing from the spirit of my invention, and I do not intend, therefore, to limit my invention to the precise construction and arrangement of parts which I have herein shown and described, nor, indeed, to the employment of the several features of improvement in one and the same general structure.

I claim and desire to secure by Letters Patent—

1. In a motor-vehicle, the combination with a running-gear frame comprising side bars and front and rear cross-bars, of springs secured to said side bars, a carriage-body supported upon said springs, a motor, transmitting-gearing, a motor-platform independent of said carriage-body, and springs independent of said first-named springs, secured to said side bars and supporting said motor-platform.

2. In a vehicle, the combination with the running-gear frame having a front cross-bar, of a front axle supported by the running-gear frame to swing about a horizontal axis, a yoke and a hub secured the one to said cross-bar and the other to said axle, the hub having bearings in said yoke and braces secured to one of said parts having vertical bearing-faces for contact with the other of said parts to support the front axle, with freedom to swing in a vertical plane.

3. In a vehicle, the combination with the running-gear frame having a front cross-bar, and a front axle, of a yoke to which said front axle is secured, and a hub having front and rear bearings in the arms of said yoke, the front cross-bar being secured in said hub, whereby it may swing in a vertical plane.

4. In a vehicle, the combination with the running-gear frame having a front cross-bar, and a front axle, of a yoke to which said front axle is secured, a hub having front and rear bearings in the arms of said yoke, the front cross-bar being secured to said hub to swing in a vertical plane, and braces secured to said front cross-bar and having bearing-faces to support said front axle.

5. In a vehicle, the combination with the running-gear frame, the front axle, and wheels mounted to oscillate with respect to said axle, of a frame secured to said axle and supported by said running-gear frame, a short shaft supported by the frame secured to the axle, an arm secured to said shaft, a link extended from said arm to the bearing of the corresponding wheel, and mechanism to oscillate said shaft.

6. In a vehicle, the combination with the running-gear frame, the front axle, and wheels mounted to oscillate with respect to said axle, of a frame secured to said axle, a hub secured to said running-gear frame and having front and rear bearings in said frame secured to the axle, a vertical shaft having bearings in said last-named frame, an arm secured to said shaft, a link extended from said arm to the bearing of the corresponding wheel and means to oscillate said shaft.

7. In a vehicle, the combination with a carriage-body free to oscillate, a front axle, independent steering-wheels mounted thereon, a steering-frame connected with the wheel-supports, a steering-shaft mounted in bearings on the body, a gear on said shaft, a second gear on a horizontal axis in mesh with the first gear, an arm carried with the second gear, and connections from said arm to the steering-frame to transmit motion and permitting relative motion of said frame and body.

8. In a vehicle, the combination with the running-gear frame, a steering arm or lever carried with said running-gear frame, and a carriage-body free to oscillate with respect to said running-gear frame, of a shaft connected with said steering-arm and means supported on the carriage-body to oscillate said shaft.

9. In a vehicle, the combination with the running-gear frame, a steering arm or lever carried with said running-gear frame, and a carriage-body free to oscillate with respect to said running-gear frame, of a shaft carried by said carriage-body, a ball-and-socket bearing for the rear end of said shaft, a vertically-slotted bearing for the forward end of said shaft, an arm depending from said shaft to engage said steering-arm and means to oscillate said shaft.

10. In a vehicle, the combination with the running-gear frame, a steering arm or lever carried with said running-gear frame, and a carriage-body mounted on said running-gear frame, of a horizontal shaft supported in bearings on said carriage-body and having a depending arm connected with said steering-arm, a gear on said shaft and a vertical shaft having a gear to engage said first-named gear and having also a handle.

11. In a vehicle, the combination with a running-gear frame having a rear member and supports for the rear axle, a front axle, a horizontal axis for said axle supported by the running-gear frame, a body independent of the running-gear frame, and supported by springs thereon, the wheels, supports upon which said wheels are free to rotate, and a pivotal connection between each of said supports and the front axle, the axis of said pivotal connection being in rear of the axis of the wheel and lying in the plane of the wheel.

12. In a vehicle, the combination with the running-gear frame and wheels, of supports upon which said wheels are free to rotate, and a pivotal connection between each of said supports and the running-gear frame, the axis of said pivotal connection being inclined upwardly and rearwardly and lying in the plane of the wheel.

13. In a vehicle, the combination with the running-gear frame and wheels, of supports upon which said wheels are free to rotate, and a pivotal connection between each of said supports and the running-gear frame, the axis of said pivotal connection being in rear of the axis of the wheel and inclined upwardly and rearwardly and lying in the plane of the wheel.

14. In a vehicle, the combination with the running-gear frame and wheels, of supports upon which said wheels are free to rotate, and a pivotal connection between each of said supports and the running-gear frame, the axis of said pivotal connection lying in the plane of the wheel and being inclined upwardly and rearwardly.

15. In a vehicle, the combination with the running-gear frame having a rear member and supports for the rear axis, a front axle, a horizontal axis for said axle supported by the running-gear frame, a body independent of the running-gear frame and supported by springs thereon, and wheels, of supports upon which said wheels are free to rotate, and a pivotal connection between each of said supports and the front axle, the axis of said pivotal connection lying in the plane of the wheel and being in the rear of the axis of the wheel.

16. In a vehicle, the combination with the running-gear frame, of a hub mounted to oscillate with respect to said frame and formed with ball-bearings at its ends, the axis of oscillation being within the hub, a wheel mounted to rotate upon said hub with corresponding ball-bearings at its ends, and balls interposed between said bearings.

17. In a vehicle, the combination with the running-gear frame and a head carried by said frame, of a stud having a bearing in said head, a hub carried by said stud to oscillate thereon and formed with ball-bearings at its ends, a wheel mounted to rotate upon said hub with corresponding ball-bearings, and balls interposed between said bearings.

18. In a vehicle, the combination with the front axle and a head carried by said axle, of a stud having a bearing in said head, a hub carried by said stud to oscillate thereon and formed with ball-bearings at its ends, a wheel mounted to rotate upon said hub with corresponding ball-bearings, balls interposed between said bearings, and a link connected to said hub to oscillate the same.

19. In a vehicle, the combination with the front axle and a head carried by said axle, of a stud having a bearing in said head, a hub carried by said head to oscillate thereon, a wheel mounted to rotate upon said hub, a sleeve mounted to slide on said axis, and a link connecting said hub to said sleeve.

20. In a vehicle, the combination with an axle, of a tubular hub mounted to oscillate upon the end of said axle, a wheel-hub mounted upon said tubular hub, interposed antifriction-bearings, and a removable retaining-ring secured to one of said hubs.

21. In a vehicle, the combination with an axle, of a tubular hub mounted to oscillate upon the end of said axle, a wheel-hub mounted upon said tubular hub, and a retaining-ring secured to one of said hubs, said tubular hub having a projection at one side for connection of means for oscillating the same.

22. In a vehicle, the combination with an axle, of a tubular hub mounted to oscillate upon the end of said axle, a stud to secure the hub to the axle, and a wheel-hub mounted upon said tubular hub and having holes to permit the manipulation of said stud.

This specification signed and witnessed this 1st day of June, A. D. 1896.

HIRAM PERCY MAXIM.

In presence of—
FELTON PARKER,
JOHN DARBY.